BISTABLE MULTIVIBRATOR EMPLOYING SINGLE FOUR ZONE SEMICONDUCTOR ELEMENT
Filed Sept. 18, 1961

INVENTOR
ARTHUR F. CAKE
BY
Eyre, Mann & Lucas
ATTORNEYS 3,174,057
Patented Mar. 16, 1965

3,174,057

BISTABLE MULTIVIBRATOR EMPLOYING SINGLE FOUR ZONE SEMICONDUCTOR ELEMENT

Arthur F. Cake, Orange, N.J., assignor to Tung-Sol Electric Inc., a corporation of Delaware Filed Sept. 18, 1961, Ser. No. 138,980
1 Claim. (Cl. 307—88.5)

The present invention relates to multivibrators and comprises a novel bistable multivibrator or frequency divider incorporating a minimum of elements and adapted to operate over a wide range of frequencies. In the preferred embodiment of the invention a single semiconductor device, two resistors and two capacitors comprise the entire bistable multivibrator. The semiconductor device of this preferred embodiment of the invention is an N-gated four zone germanium semiconductor such as a 2N1966. Such a device is triggered by application of a negative pulse to its gate and turns off when the current therethrough is reduced below the sustaining current. By incorporating a suitable oriented diode in the circuit other four zone semiconductor devices whether P or N-gated, can be used.

In the preferred embodiment of the circuit utilizing an N-gated four zone device such as the 2N1966, the circuit comprises the four zone device with its gate or inner N zone connected to the positive terminal, specifically ground, of a source of operating energy and with its emitter or end P zone connected through a resistor to to ground and its collector or end N zone connected through a second resistor to the negative terminal of the source of energy. A capacitor is connected across the collector and emitter and the collector is connected to the input terminal through a capacitor. When positive pulses are impressed upon the input terminal output pulses of one-half the frequency appear at the collector terminal. When a diode is connected across the gate and the emitter in a direction to insure that the gate will not become positive with respect to the emitter a thyristor may be used in place of a device such as the 2N1966. A silicon controlled rectifier may be employed in the circuit if a diode is coupled between the gate and the collector and a resistor is inserted between the gate and one terminal of the source. When such a device is used, of course, the polarity of the source and the orientation of the diode will depend upon whether the rectifier is N or P-gated.

Figure 1:
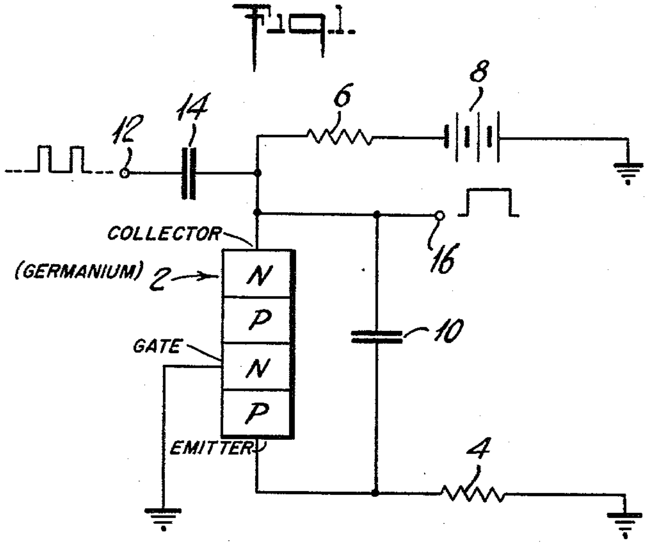
Figure 2:
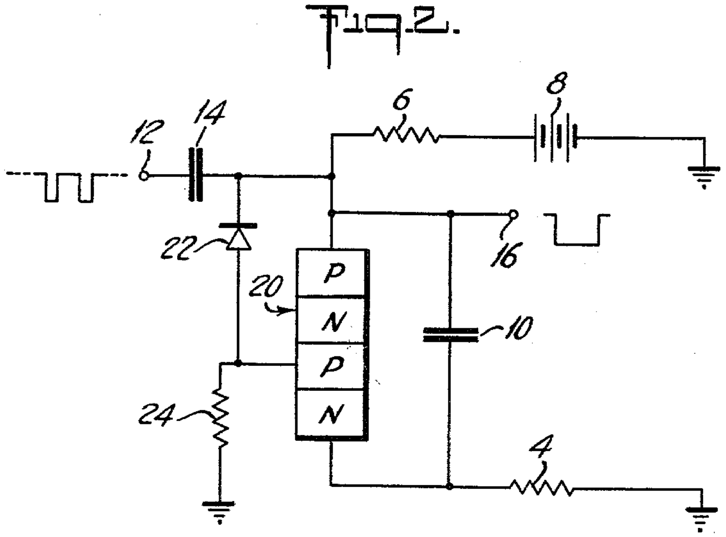

For a better understanding of the invention and of the operation of circuits embodying the same, reference may be had to the accompanying drawing of which:

FIG. 1 is a circuit diagram representing the preferred embodiment of the invention employing an N-gated four zone device such as the 2N1966; and FIG. 2 is a similar diagram of a bistable multivibrator but employing a P-gated silicon controlled rectifier.

In FIG. 1 the four zone device, specifically a 2N1966 is shown at 2 with its gate connected to ground, its emitter connected through a resistor 4 to ground and its collector connected through resistor 6 to the negative terminal of a source of operating energy shown as a battery 8, the positive terminal of which is grounded. A capacitor 10 is connected across the emitter and collector of the semiconductor device 2 and an input terminal 12 is connected through a capacitor 14 to the collector. The output terminal 16 is connected to the collector of the four zone device.

The operation of the circuit will now be described.

When the semiconductor device is not conducting, there is no collector current flowing and therefore the collector will be at substantially the negative potential of the source 8. The emitter will be at ground potential. If now a pulse, going from ground to a more positive potential, is impressed upon terminal 12 the potential at the collector rises drawing electrons through resistor 6 from the source and from capacitor 10 that had been charged from the source. This positive pulse, acting through capacitor 10, raises the potential at the emitter to a value above ground and thereby initiates electron flow through resistor 4 to the emitter and also from ground through the base-emitter diode. This current turns on the semiconductor device. The semiconductor device will remain "on" until the next positive going pulse is impressed on the input terminal. Since the four zone device is "on" the collector and emitter are at essentially the same potential and capacitor 10 is not charged. The next pulse causes some of the current flowing through resistor 6 to be diverted to charge capacitor 14. This reduces the current through the four zone device to a value below that of the sustaining current and causes the semiconductor device to turn off. Since the potential at the collector does not change appreciably, due both to the charging current from the source and the low collector to gate breakdown voltage of the unit, there is no charge coupled through capacitor 10 to turn the unit "on" again. It therefore remains "off" until the next incoming pulse when the operation repeats.

In FIG. 2 the bistable multivibrator circuit of the invention is shown incorporating a P-gated four zone silicon controlled rectifier 20. In this case the polarity of the battery 8 is reversed with the negative terminal grounded. As in the case of FIG. 1, the four zone device has its collector connected through resistor 6 to one terminal of the source and its emitter connected to ground through resistor 4. The input terminal 12 is connected through capacitor 14 to the collector and the output terminal 16 is also connected to the collector. In order to clamp the positive voltage appearing at the collector to ground a diode 22 is connected across the collector and gate with its anode connected to the gate and its cathode connected to the collector. A resistor 24 is connected between the gate and ground. The operation is substantially the same as described in connection with the circuit of FIG. 1 except, of course, negative pulses are impressed upon the input terminals and negative pulses of one-half the frequency appear at the output terminal. When the device 20 is "off," the potential of the collector is substantially that of the source 8 and capacitor 10 is charged to the potential of the source. When a negative pulse is impressed upon the input terminal the collector potential is driven negative with respect to the emitter, the emitter is driven negative with respect to ground and current in a turn on direction flows through the emitter gate diode, the gate being at ground potential. Accordingly the device turns on and remains on until the next negative going pulse is impressed upon the input terminal. When the next negative pulse is impressed upon the input terminal the charging current for capacitor 14 reduces the current through the device 20 to a value below that of the sustaining current and causes the device to turn off.

If the four zone device is an N-gated silicon rectifier a diode and resistor such as diode 22 and resistor 24 of FIG. 2 could be employed except that the diode would be oriented with its anode connected to the collector and its cathode connected to the gate and the polarity of the source would be reversed.

By way of example suitable constants for the circuit of FIG. 1 are given in the following table. Obviously the invention is not limited to the specific values stated as other values, depending upon the desired frequency of oscillation, could be employed.

*Table*

| | |
|---|---|
| Resistor **6** | 100 ohms. |
| Resistor **4** | 22 ohms. |
| Capacitor **14** | .05 microfarad. |
| Capacitor **10** | .05 microfarad. |
| Device **2** | 2N1966. |
| Source **8** | 12 volts. |

The frequency of a circuit having the constants specified above is about 25 kc. With other circuit values, frequencies of 100 kc. and higher may be obtained. For the circuit of FIG. 2, with constants such as given in the table, the resistor 24 would be about 10 or 20 ohms but in any event less than the resistance of resistor 4.

In the foregoing description the term "emitter" has been used as designating the end zone next to the gate of a four zone device and the term "collector" has been used to designate the other end zone of a four zone device. Other terminology, particularly with reference to silicon controlled rectifiers, has been employed in the art. For example, the end N zone of a P-gated silicon controlled rectifier has sometimes been called the "cathode" rather than the "emitter" and the end P zone has been called the "anode" rather than the "collector." As no consistent terminology is yet in use in the industry, the terms "emitter" and "collector" as above defined have been used herein and in the accompanying claim.

The invention has now been described with respect to two specific embodiments. It will be apparent from the foregoing description that the invention provides a bistable multivibrator or frequency divider of a minimum number of components thus making the circuit not only economical to produce but one that requires a minimum of space.

The following is claimed:

A five element bistable multivibrator comprising a first and second resistor, a first and second capacitor and a semiconductor device, said device being a four zone germanium semiconductor device with gate, emitter and collector, terminals, a source of operating energy having a positive terminal tied to said gate terminal and connected through said first resistor to said emitter terminal and a negative terminal connected through said second resistor to said collector terminal, and an input terminal connected through said first capacitor to said collector terminal, said second capacitor being connected directly across said semiconductor device whereby when positive voltage pulses are impressed on said input terminal, said semi-conductor device is alternately rendered conductive and non-conductive, yielding at the collector terminal positive voltage pulses of one half the frequency of the pulses impressed on said input terminal.

References Cited in the file of this patent

UNITED STATES PATENTS 2,997,604 Shockley ---------------- Aug. 22, 1961

OTHER REFERENCES

Solid State Products, Inc.—Bulletin D410–02, page 14, March 1960.